United States Patent Office 3,759,717
Patented Sept. 18, 1973

3,759,717
CHEMICALLY LEAVENED BAKERY AND CONFECTIONARY PRODUCTS
Bruce D. Buddemeyer, Overland Park, Kans., and John R. Moneymaker, Kansas City, Mo., assignors to The Paniplus Company, Kansas City, Mo.
No Drawing. Filed June 30, 1964, Ser. No. 379,387
Int. Cl. A21d *13/08*
U.S. Cl. 99—92                                    35 Claims

ABSTRACT OF THE DISCLOSURE

Chemically leavened cake products and confectionary products having incorporated therein an addition agent containing a non-toxic, mono aliphatic ester of a dicarboxylic acid wherein said dicarboxylic acid contains up to ten carbon atoms and said mono aliphatic group contains 12 to 24 carbon atoms.

---

This invention relates to chemically leavened baked and bakery confections such as icings, fillings, fondants, cremes and the like, and more particularly to products of the type described which possess enhanced physical and baking characteristics.

Cake is illustrative of the larger class of chemically leavened dough products to which this invention pertains, and is the most important of such products commercially.

Basically cake is made from flour, a chemical leavening agent such as baking powder, sugar and water. Various miscellaneous ingredients such as eggs, shortening and milk are also ordinarily employed in cake recipes, including prepared cake mixes.

It is well established in the art of cake making that the ratio of ingredients in a formula as well as the method and time of incorporation of the ingredients is extremely important. In addition, the nature of the ingredients employed plays a major role in determining the quality of the finished product.

In the bakery, the batter ingredients undergo mechanical mixing to becomes a fully developed batter. This batter must inherently possess the characteristics necessary to produce a good cake with a high degree of product uniformity. To achieve such a batter, the baker ordinarily relies on improving agents to provide tolerance in his production. The range of this tolerance is a very narrow one without the help of such improving agents, so narrow in fact that the normal natural variability of such raw ingredients as flour, can seriously affect the quality of this product. In view of the trend toward larger and more efficient bakeries, the seriousness of low production tolerance cannot be overemphasized.

An object of the present invention is to assist the baker to maintain and improve the quality of chemically leavened products, such as cake and bakery confections, such as icings, fondants, fillings, cremes, and the like.

Another object of this invention is to provide improved prepared cake and bakery confection mixes which have a high degree of reliability in the hands of the housewife.

The improvers of this invention, rather than aiming at specific problems in production, are intended to improve the overall production of chemically leavened products and bakery confections by reacting with the basic ingredients of such products to permit fuller use of their innate but heretofore not fully developed characteristics. The improvers of this invention act to modify the various ingredients making up the ultimate product so that, in general, they will yield a better volume, a higher quality score, and better compressibility, the enhancement of which characteristics is of great help to the modern baker.

The improving agents described herein function as emulsifiers to improve the coating action of shortening on the various cake ingredients and may, under proper conditions, replace shortening in this function. Coating the starch and protein components of a batter system with a thin film of lipid tends to segregate hydrated components of a batter system so that the baked product is not an unpalatable compact solid. Certain of the agents described herein affect the continuity of the egg albumen structure, which binds the batter ingredients, thereby leading to the formation of a protein network which is less continuous than the network produced when such agents are not used. This action by the improvers of this invention enhances the eating characteristics of the finished cake, and more particularly the tenderness and "shortness" thereof.

During the preparation of chemically leavened baked products, air is incorporated into the batter. During processing, the incorporated air is dispersed throughout the batter as minute globules or nuclei. The improvers of this invention affect the distribution, size, and number of gas nuclei and improve the dispersion of fat. In cake batters, these factors determine, to a large extent, the volume, symmetry, and crumb structure of the final product. The agents described herein serve to stabilize the emulsion system of the batter and to enhance the ability of the batter to retain its incorporated air. This function is particularly pronounced in formulations which do not contain shortening.

The agents of this invention also serve to reduce the hydrophylic characteristics of starch. In wet mixes, e.g., cake batters, containing farinaceous material, this has the effect of depressing the swelling of the starch granules, thereby enhancing the freshnes of the product.

In confections, such as foam or cream icings, fillings, and fondants, the improvers of this invention greatly aid in dispersion of fats, thereby making it possible to produce a uniform and stable emulsion with improved body and texture, and increased volume.

Chemically leavened baked products and bakery confections containing the improvers described herein and possessing all or some of the enhanced characteristics described supra constitute paramount objects of this invention.

Other objects will in part be obvious and will in part be made clear from the following description.

These and other objects are attained by the utilization in products of the type described of relatively small but effective amounts of certain specific long chain alkyl mono-esters of dicarboxylic acids, and/or the salts of such esters. Such mono-esters have been found to exert an improving effect not only on the finished products themselves, but also in the processing and manufacturing of such products.

Especially suitable and preferred for use are the monoalkyl esters, including the salts of such esters, resulting from the reaction of a fatty alcohol having 12 to 24 carbon atoms, including mixtures thereof, and a dicarboxylic acid compound having up to and including 10 carbon atoms. Included within the dicarboxylic acid compounds that may be used are succinic, glutaric, adipic, fumaric, malic, azelaic, and sebacic acids, acyl halides (e.g., bromides, chlorides, iodides, fluorides) of the foregoing acids, anhydrides of the foregoing acids, and mixtures of the foregoing.

As will be made clear hereinbelow the alkyl substituent which is generally preferred is derived from saturated fatty alcohols corresponding to the formula $C_nH_{2n+1}OH$, wherein $n$ is an integer from 12 to 24, including mixtures thereof. However, alcohols corresponding to the formulae: $C_nH_{2n-1}OH$, $C_nH_{2n-3}OH$ and $C_nH_{2n-5}OH$, wherein $n$ is an integer from 12 to 24, including mixtures thereof, have also been found to have utility in providing the alkyl substituents of the novel esters herein described, and may be used.

The mono-esters may readily be prepared by reacting such fatty alcohols with the described dicarboxylic acids, per se, or with the anhydrides or acid halides of the dicarboxylic acids. Depending upon the reactants, a solvent or solvent system may be used to facilitate intimate contact and improve reactivity of the reactant materials.

The following reaction between stearyl alcohol and adipic acid is typical of the reaction mechanisms involved in forming the fatty alcohol mono-esters of dicarboxylic acids suitable for use herein.

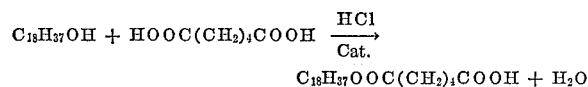

It will be clear from the foregoing description that the mono-esters generally correspond to the formula

wherein R' is an aliphatic hydrocarbon substituent containing 12 to 24 carbon atoms and derived from a saturated or unsaturated alcohol; R is an aliphatic hydrocarbon group having up to and including 8 carbon atoms; and Z is a cation, e.g., hydrogen, when the compound is in the form of the free acid, and a metal when the compound is in the form of a metal salt.

R may be saturated or unsaturated, substituted (e.g., hydroxyalkyl) or unsubstituted. R may also contain an even or odd number of carbon atoms.

The mono-esters may be used in either the free acid or the salt form. Among the salts may be mentioned the alkali metal salts, such as sodium and potassium, the alkaline earth metal salts, such as calcium and magnesium, and the ammonium and aluminum salts. The alkali metal salts constitute preferred embodiments of the esters.

The acid form of the mono-esters may be converted to the ester salts by reaction in a well known manner with a hydroxide, e.g., NaOH, KOH, or salt, e.g., $CaCO_3$, of a metal whose ester salt is desired.

A small, effective amount of the mono-esters may be added to the composition formula either separately, or admixed with each other or with other ingredients.

With baked goods of the type described, the agents, if in salt form, are introduced either directly, or admixed with flour or water; if in the acid form, the agents are preferably admixed with the fatty components, and in this way introduced into the formulae for making the desired product.

Based upon the flour content of the baked products, the amount of the mono-ester will usually range up to about 2 percent, or between about 0.05 and 2.00 percent, with best results being obtained at a level of between about 0.1 and 0.5 percent.

Shortenings or other lipoidal materials with which the addition agents of the present invention may be combined for subsequent incorporation into the baked goods are of the usual type, and in general are triglyceride oils or fats derived from animal sources such as lard or tallow and from plant sources such as the seed oils of corn, cotton, soy and the like. It is normal practice, although not essential, for the shortenings to be refined and processed to improve their properties. The usual treatments include catalytic hydrogenation to improve the plasticity, increase hardness and reduce the iodine number of the fatty material, and heat treatment in the presence of alkaline catalysts, with or without added glycerine, to improve the physical properties and functionality. For instance, the plastic super-glycerinated vegetable shortenings have been hydrogenated and subjected to inter-esterification reactions to improve the physical characteristics and increase the content of mono- and diglycerides and to increase the emulsification properties of the shortening. Shortenings of the usual type may also contain glycerine and/or natural or hydroxylated lecithin.

When the addition agents are to be combined with shortening and/or oil, this may be done by dissolving the agents in the fatty component, and then stirring and tempering the resulting mixture. Final treatment may also include the chilling and whipping treatments of the Votator process in the case of plastic shortenings.

When the mono-esters of this invention are in the acid form, they are preferably added to the bakery formulae with the shortening. When in salt form, they will ordinarily be added in dry powdered form or emulsified with water.

Shortening compositions containing the desired amount of the mono-esters disclosed herein may be prepared and added in lieu of the usual shortening. Obviously, however, mixtures of the usual shortenings and larger amounts of the addition agent can be produced, and this admixture can be used in lieu of only a portion of the usual shortening with the same net benefits resulting, and such compositions are to be considered part of this invention.

Similarly, the addition agents may be admixed with the flour or the water, and in this form added to the formulae.

The ingredients employed in making the chemically leavened baked goods and bakery confections form no part of the present invention since any suitable formulae may be used. The basic ingredients used in the manufacture of chemically leavened baked goods, such as cake, are flour, water, sodium chloride, sugar, and a chemical leavening agent, such as baking powder. For commercial cake and prepared cake mixes, milk, shortening and eggs in varying amounts are conventionally added to these basic ingredients.

The following examples are illustrative of the manner in which the additives of the present invention can be synthesized.

EXAMPLE 1

Preparation of a mono alkyl ester of succinic acid

A 5 liter reaction flask, equipped with a mechanical stirrer, thermometer, and pressure release valve, was charged with 6.7 moles (670.6 gms.) of commercial food grade succinic anhydride, molecular weight 100.1. The anhydride was melted by means of a heating mantle surrounding the flask and warmed to 130° C. with continuous stirring. Then, 6.1 moles (1607.4 gms.) of a commercial food grade saturated fatty alcohol (average molecular weight 263.5; approximate composition—1% $C_{12}$; 4% $C_{14}$; 32% $C_{16}$; 62% $C_{18}$; 1% $C_{20}$) was heated to melting temperature and then gradually introduced into the succinic anhydride flask over a 45 minute period, as the temperature of the reactants in the flask was increased to 150° C. After completing the addition of the fatty alocohl composition, the reaction mass was held at 150° C. with continuous stirring for 60 minutes. The product was then transferred warm to a 4 liter beaker and washed twice at 90° C. with 2 liters of saturated sodium chloride solution and finally with warm distilled water. The washed sample was allowed to solidify and then transferred to a vacuum dessicator. Under a vacuum of approximately 10 mm. Hg, the product was gradually melted by application of heat from an infrared lamp, thus effecting drying. The resultant product was a light, cream colored, soft, waxy solid at room temperature, having an acid value of 154, a saponification value of 312, and a melting point range of 63–64° C.

The following tabulation sets down the theoretical acid and saponification values and the range of values obtained from the analysis of compounds resulting from a number of syntheses.

|  | Theoretical | Actual |
| --- | --- | --- |
| Acid value | 154.3 | 154–162.4 |
| Saponification value | 308.6 | 298.7–312 |

Substantially all of th reaction product is comprised of the compound $R'OOCCH_2CH_2COOH$, wherein R' is the saturated alkyl group of the commercial fatty alcohol employed.

EXAMPLE 2

Preparation of a mono cetyl ester of glutaric acid

A 1 liter three-necked reaction flask, fitted with a stirrer, thermometer and pressure relief valve, was charged with 1.95 moles (222.5 gms.) of commercial glutaric anhydride, molecular weight 114.1, and warmed to 100° C. by a heating mantle. Then 1.3 moles (315.2 gms.) of practical grade 1-hexadecanol (cetyl alcohol) molecular weight 242.5, was melted and gradually introduced into the reaction flask during a 30 minute period with constant agitation. The reaction was continued for 3 hours at a temperature of 100°–110° C. The warm liquid reaction product was washed twice with hot water and then allowed to solidify. The product was dried by melting under vacuum in a dessicator equipped with an infrared heating lamp. The resultant product was a waxy solid with an acid value of 156, saponification value 306, and melting point range of 66°–67° C.

The following tabulation sets down the theoretical acid and saponification values and the range of values obtained from the analysis of compounds resulting from a number of preparations as described above.

|  | Theoretical | Actual |
| --- | --- | --- |
| Acid Value | 157.3 | 151.5–155.7 |
| Saponification value | 314.6 | 306–309 |

The variations observed are to a large extent due to the purity of the reagents employed in the syntheses.

Substantially all of the reaction product is comprised of the compound corresponding to the formula:

$$C_{16}H_{33}OOCCH_2CH_2CH_2COOH$$

EXAMPLE 3

Preparation of a mono alkyl ester of adipic acid

Five hundred and twenty six and one tenth (526.1) grams (3.6 moles) of commercial adipic acid, molecular weight 146.14, was weighed into a 3 liter reaction flask fitted with a mechanical stirrer, thermometer, and insulated dropping funnel. The adipic acid was warmed by means of a heating mantle controlled by a powerstat to 155° C. A fatty alcohol mixture (molecular weight 263.5) conforming the following approximate composition:

| | Percent |
| --- | --- |
| Lauryl alcohol | 1 |
| Myristyl alcohol | 4 |
| Cetyl alcohol | 32 |
| Stearyl alcohol | 62 |
| Arichidyl alcohol | 1 | was simultaneously warmed to 55° C. and introduced into an insulated dropping funnel. 790.5 grams (3.0 moles) of the fatty alcohol composition was employed. After melting the adipic acid, a catalytic amount (0.6 mls.) of hydrochloric acid was added thereto, and with stirring, the addition of the fatty alcohol composition was initiated. The addition required approximately one hour. Following the addition of the fatty alcohol, the reactor was modified by removing the dropping funnel and inserting a goose-neck and distillation condenser with graduated receiver. A vacuum line was connected to the receiver. Under a vacuum of approximately 22 inches, the reactants were warmed at a temperature of 165° C. for 5 hours. Ninety-five percent of the theoretical water of esterification was removed during this period.

The product was washed twice with saturated salt water at melt, then placed in a 90° C. moisture oven for 2 hours. Residual salt settled to the bottom of the flask and the clear liquid product was decanted off. Moisture of the final product was found to be 0.3 percent.

The reaction product was a very light creamed color waxy solid. This material had an acid number of 115, a saponification number of 247, and a melting point of 51.5° C. Based on these values, approximately an 83 percent yield of the monoalkyl adipic acid was obtained.

The reaction product corresponds to the formula:

$$R'OOC(CH_2)_4COOH$$

wherein R′ corresponds to the alkyl substituents of the commercial fatty alcohol employed.

EXAMPLE 4

Preparation of a mono alkyl ester or fumaric acid

A five liter three-neck round bottom reaction flask was fitted with a mechanical stirrer, thermometer and insulated dropping funnel and attached to a hydrogen chloride generator. The reactor was charged with 755.06 gms. (7.7 moles) of maleic anhydride and warmed to 100° C., using a heating mantle controlled by a powerstat. With constant stirring, 1844.5 gms. (7.0 moles) of a fatty alcohol composition primarily composed of cetyl and stearyl alcohols as described in Example 3 above was introduced gradually into the reaction flask during a period of 30 minutes. Dry hydrogen chloride gas was bubbled into the reaction mixture during and subsequent to the addition of the alcohol. The reaction temperature was increased to 125° C. in the initial 10 minutes. The 125° C. temperature was maintained and hydrogen chloride gas addition was continued with constant stirring for 60 minutes following completion of the alcohol addition. The reaction product was then allowed to cool and stand at room temperature in the flask overnight.

The reaction product was re-melted and washed twice at 90° C. with 2 liter aliquots of saturated sodium chloride solution and then vacuum dried.

The resultant product was a cream colored hard waxy solid at room temperature having the following physical and chemical properties:

|  | Theoretical | Actual |
| --- | --- | --- |
| Acid number | 155.1 | 145.1 |
| Saponification number | 310.2 | 297.3 |
| Melting point, ° C | | 80–81 |

Polargraphic analysis of samples subjected to mild saponification, a treatment which is known not to isomerize maleic acid to fumaric acid, substantiated that a substantially complete conversion of maleic anhydride (cis) to the fumarate ester (trans) was accomplished.

Thus, the reaction product corresponded substantially completely to the formula:

$$R'OOCCHCHCOOH \text{ (trans)}$$

wherein R′ corresponds to the alkyl substituents of the commercial fatty alcohol employed.

EXAMPLE 5

Synthesis of a mono alkyl ester of malic acid

A 500 milliliter, three-neck reaction flask was adapted with a mechanical stirrer, reflux condenser and centigrade thermometer. The flask was charged with 50 mls. of 1-4 dioxane and 1 ml. of concentrated hydrochloric acid. This mixture was warmed to 60° C. and 134.1 gms. (1.0 mole) of malic acid, molecular weight 134.1, was introduced over a 15 minute period with constant stirring. Then, 131.75 gms. (0.5 mole) of a stearylcetyl alcohol mixture, molecular weight 263.5, as described in Example 3 above was added to the reaction flask over a period of 15 minutes with increasing temperature. The contents of the flask was then refluxed for 2 hours at approximately 95° C. Following reflux, the reaction mixture was removed to a beaker and the product was allowed to solidify over the dioxane solvent. The cake was removed from the beaker, warmed to melt and transferred to a separatory funnel. At melt, the reaction product was washed twice with 85° C. saturated salt water. After the second wash, an emulsion was formed which was dissolved in ether in a warm water bath. Finally the ether was evaporated and the compound was allowed to solidify. The resultant cake was dried by melting in a vacuum desiccator equipped with infrared heat. The resultant product was a white, hard, waxy solid having the following chemical and physical properties:

|  | Theoretical | Actual |
| --- | --- | --- |
| Saponification number | 296 | 235.6 |
| Melting point, ° C | | 48–49 |

It corresponded to the formula:

R'OOCCHOHCH$_2$COOH wherein R' corresponds to the alkyl substituents of the commercial fatty alcohol employed.

EXAMPLE 6

Preparation of the sodium salt of a monocetyl ester of glutaric acid

One hundred grams of the monocetyl glutaric acid of Example 2, molecular weight 356.56, were melted in a tall form, 500 ml. beaker in a hot water bath. 14.5 gms. of sodium carbonate, molecular weight 105.99, were added slowly with constant stirring. The neutralization reaction, as indicated by foaming, continued for approximately 20 minutes. The material was then dried under vacuum in a desiccator using infrared heat. Several hours were required to remove the water of neutralization. In drying, the temperature of the material reached 225° C. The final product, when cooled, was hard and brittle with a light tan color, and dispersible in water. The material was easily pulverized using a mortar and pestle. It had the following chemical and physical characteristics:

|  | Theoretical | Actual |
| --- | --- | --- |
| Acid number | 0 | 0.5 |
| Saponification number | 148.2 | 150.15 |
| Melting point, ° C | | 150 |

The product corresponded to the formula:

C$_{16}$H$_{33}$OOCCH$_2$CH$_2$CH$_2$COONa

EXAMPLE 7

Preparation of a mono alkyl ester of azelaic acid

A one liter, three-neck reaction flask was equipped with a mechanical stirrer, graduated dropping funnel, thermometer and water condenser. 226 gms. (1.2 moles) of azelaic acid (average molecular weight 190.2, melting point range 96°–101° C., 85 percent pure containing 9 percent dibasic acids less than 9 carbons and 6 percent greater than 9 carbons) was introduced and the acid was brought to a temperature of 150° C. by means of a heating mantle controlled by a variable rheostat. One milliliter of concentrated hydrochloric acid was pipetted into the flask and then 263.5 gms. (1 mole) of a stearyl cetyl alcohol composition (approximate composition 1% C$_{12}$, 4% C$_{14}$, 32% C$_{16}$, 62% C$_{18}$ and 1% C$_{20}$) was added drop-wise at melt over a period of 3 hours. During this time interval, approximately one-half of the theoretical water of esterification was collected. Heating at 150° C. with continuous stirring was continued for an additional 5 hours and 15 minutes at which time the total theoretical water of esterification was recovered. The product was then washed at 85° C. with 500 milliliters of distilled water and then dried, employing about 10 mm. mercury vacuum and heat from an infrared lamp.

The resultant product was a buff colored, hard, waxy solid at room temperature, having the following physical and chemical properties:

|  | Theoretical | Actual |
| --- | --- | --- |
| Acid number | 128.8 | 114.8 |
| Saponification number | 257.6 | 245.4 |
| Melting point range, ° C | | 49.5–51.0 |

It corresponded to the formula:

R'OOC—(CH$_2$)$_7$—COOH wherein R' corresponds to the alkyl substituents of the commercial fatty alcohol employed.

EXAMPLE 8

Preparation of a mono alkyl ester of sebacic acid

The apparatus and procedure described in Example 7 was employed with slight modification for the preparation of the mono-fatty alcohol derivative of sebacic acid. The reaction flask was charged with 242.6 gms. (1.2 moles) of CP grade sebacic acid. On warming to 200° C., 263.5 gms. (1.0 moles) of a stearyl-cetyl alcohol composition as described in Example 3 was added over a period of 55 minutes. Hydrochloric acid was not employed as a catalyst in this reaction. Heating with continuous stirring at 200° C. was continued for 30 minutes after the alcohol addition was complete. Following this time period, the theoretical water of esterification was recovered.

The resultant product was washed twice with one liter of distilled water and vacuum dried with the aid of an infrared heating lamp. The final product was a light cream colored, hard, brittle solid at room temperature, having the following physical and chemical properties:

|  | Theoretical | Actual |
| --- | --- | --- |
| Acid number | 125.3 | 119.0 |
| Saponification number | 250.6 | 237.0 |
| Melting point range, ° C | | 66–68 |

It corresponded to the formula:

R'OOC(CH$_2$)$_8$COOH wherein R' corresponds to the alkyl substituents of the commercial fatty alcohol employed.

EXAMPLE 9

Preparation of a mono oleyl ester of fumaric acid

A reaction flask was charged with 107.8 gms. (1.1 moles) of maleic anhydride and warmed to 125° C. with stirring. Then 268.0 gms. (1.0 mole) of oleyl alcohol (approximate composition: unsaturated: C$_{18}$—85%; C$_{16}$—4%; C$_{18}$[linoleyl]—6%; saturated: C$_{14}$—1%; C$_{16}$—2%; C$_{18}$—1%; C$_{20}$—2%) was introduced slowly into the reaction flask during a period of 30 minutes. The reaction mixture was stirred constantly and dry hydrogen chloride gas was bubbled through the reactants to insure complete conversion of the maleic (cis) to the fumaric (trans) ester. Following the addition of the alcohol, the temperature of the reactants was maintained at 125° C. with stirring and in the presence of dry hydrogen chloride for a period of 60 minutes. The resultant product was washed at 50° C. with four aliquots of salt water and finally dried under vacuum.

The resultant product was a dark cream colored, soft, plastic solid at room temperature, having the following chemical and physical characteristics:

|  | Theoretical | Actual |
| --- | --- | --- |
| Acid number | 153.3 | 148.7 |
| Saponification number | 306.3 | 291.7 |
| Melting point range, ° C | | 41–43 |

It corresponded to the formula

C$_{18}$H$_{35}$OOCCHCHCOOH (trans).

EXAMPLE 10

Preparation of mono oleyl ester of succinic acid

A 500 milliliter, three-neck reaction flask was fitted with mechanical stirrer, centigrade thermometer and pressure relief valve and charged with 110.1 gms. (1.1 mole) of succinic anhydride, molecular weight 100.1. The succinic anhydride was melted in the flask and the temperature was raised to 130° C. Then, 267.5 gms. (1.0 mole) of oleyl alcohol, molecular weight 267.5, 77 percent unsaturated, was warmed and added to the melted succinic anhydride with gradually increasing temperature. Following the addition of the oleyl alcohol, the temperature was increased to 150° C., and the reaction was continued for one hour.

The resultant product was washed twice with 85° C. salt water and dried in a vacuum oven at 60° to 70° C. The product was a clear amber liquid at room temperature with the following chemical and physical characteristics:

|   | Theoretical | Actual |
|---|---|---|
| Acid number | 152.6 | 154.3 |
| Saponification number | 305.2 | 294.5 |
| Melting point range, °C |  | 19-20 |

It corresponded substantially to the formula:

$$C_{18}H_{35}OOCCH_2CH_2COOH$$

It will be understood by those skilled in the art that the formulae given in Examples 1 to 10 represent only the major mono-ester component of the reaction product. For instance, in Examples 9 and 10, the mono-esters with alkyl substituents other than oleyl ($C_{18}H_{35}$—) are present because of the nature of the alcohol used as a starting material.

It will further be clear from Examples 1 to 10 that in making the mono-esters, the dicarboxylic acid compound is employed in stoichiometric amount, and usually in excess of stoichiometric amount, based on the alcohol.

The improved physical and baking characteristics of chemically leavened baked goods containing the improvers described herein will now be described with particular reference to cake.

The compounds were tried in laboratory test bakes to determine their performance in complete batters under conditions which parallel those in a bakery. The test procedures will now be described.

TEST FORMULAE: WHITE AND YELLOW CAKE PREPARED MIX

| Ingredients | Baker's percent | Per cake, gms. |
|---|---|---|
| Fine granular sugar | 109 | 243.00 |
| Cake flour | 100 | 223.83 |
| Salt | 2.4 | 5.40 |
| Non fat dry milk | 3.6 | 8.10 |
| Bicarbonate of soda | 1.2 | 2.70 |
| Sodium aluminum phosphate | 1.3 | 2.97 |
| Shortening | 24 | 54.00 |

*Baker's percent, as used throughout, is based on the total flour weight in the formulae as 100%.

WHITE LAYER CAKE BATTER PREPARATION

| Ingredient | Amount | Method |
|---|---|---|
| Prepared Mix | 9 oz. (540 gms.) | Using kitchen aid mixer, mix 2 min. on 4th speed. |
| Water | ½ cup (135 ml.) |  |
| Egg white | 1 (35 ml.) |  |
| Water | ½ cup (135 ml.) | Mix 15 sec. on 1st speed, scrape down and mix 2 min. on 2nd speed. |
| Egg white | 1 (35 ml.) |  |

YELLOW LAYER CAKE BATTER PREPARATION

| Ingredient | Amount | Method |
|---|---|---|
| Prepared mix | 19 oz. (540 gms.) | Using kitchen aid mixer, mix 2 min. on 4th speed. |
| Water | ½ cup (135 ml.) |  |
| Whole egg | 1 (50 ml.) |  |
| Water | ½ cup (135 ml.) | Mix 15 sec. on 1st speed, scrape down and mix 2 min. on 2nd speed. |
| Whole egg | 1 (50 ml.) |  |

White and yellow layer cake handling and making conditions

Maintain batter temperature of 75° F.
Scale 445 gm. or 0.98 lbs. of battery per 8″ x 1½″ round pan
Bake approximately 23 min. at 350° F.

TEST FORMULAE: WHITE AND YELLOW BATTER WHIP CAKES

| Ingredients | White, baker's percent | Yellow baker's percent |
|---|---|---|
| Cake flour | 100.0 | 100.0 |
| Granulated sugar | 110.0 | 110.0 |
| Baking powder | 6.0 | 6.0 |
| Granulated salt | 3.0 | 3.0 |
| Non fat dry milk | 10.0 | 10.0 |
| Corn syrup | 4.0 | 4.0 |
| Frozen egg whites | 35.0 | 13.0 |
| Frozen whole eggs | 8.0 | 30.0 |
| Water | 60.0 | 60.0 |
| Dry vanilla concentrate | 0.4 | 0.4 |
| Water | 41.2 | 41.4 |
| Total absorption | 101.2 | 101.2 |

Batter preparation and baking conditions, white and and yellow whip cakes

First stage: The dry ingredients, the emulsifier and 60% water are mixed for 15 sec. at 1st speed in a Hobart C-100 mixer with a wire whip. Mixing is then continued for 1 min.-45 sec. at 2d speed.

Second stage: Add all of the eggs over a 1 min. period at 1st speed, scrape down and continue mixing for 4 min. at 3rd speed.

Third stage: Add balance of water (41.2%) over a 1 min. period at 1st speed then scrape down. Mix an additional 3 min. at 1st speed. Bake 368.4 gms. in an 8″ round pan at 375° F. for 24 minutes.

Batter temperature—72-75° F.

Allow to cool 45 min. prior to measuring volume by rape seed displacement and cutting for quality comparison.

Cake quality comparison

The quality of the cakes baked in accordance with the foregoing porcedures and recipes were evaluated using a modification of the system used by the American Institute of Baking. Scoring was as follows:

| Factor: | Relative value |
|---|---|
| Symmetry | 4 |
| Bake [1] | 8 |
| Volume [2] | 8 |
| Color of crumb | 5 |
| Grain | 5 |
| Texture | 10 |
| Flavor and aroma | 12 |
| Eating quality | 8 |
| Icing and filling | 40 |
| Total quality | 100 |

[1] The term "bake" refers to the overall external appearance of the un-iced cake.
[2] "Volume" is evaluated according to the following table: 1000–1100 cc.=8; 900–1000 cc.=7; 800–900 cc.=6; 700–800 cc.=5; 600–700 cc.=4; 500–600 cc.=3; 400–500 cc.=2; 300–400 cc.=1; 300 and less=0.

The compounds specifically tested were the following:

| Abbreviation: | Compound |
|---|---|
| SFA | Mono stearyl fumaric acid. |
| SMA | Mono stearyl maleic acid. |
| SSA | Mono stearyl succinic acid. |
| SGA | Mono stearyl glutaric acid. |
| SCA | Mono stearyl citric acid. |
| OFA | Mono oleyl fumaric acid. |

The listed compounds were prepared following the procedures of the examples, supra. In making the stearyl derivatives, a fatty alcohol mixture corresponding to that described in Example 3 was used, while in preparing the oleyl derivatives, the oleyl alcohol composition described in Example 9 was employed.

Preparation of compounds for introduction into tests

Salt form: Compound neutralized in accordance with its acid number to give the hydrated sodium salt.

Acid form: Compound melted and dispersed in the shortening prior to being introduced into the batter.

Functionality data obtained

Using the foregoing cake formulae, baking procedures and scoring technique, the specific compounds listed supra in both salt and acid form were evaluated for functionality as cake improving agents.

The test results are tabulated in Tables 1–2 below.

Procedure for making dessert cream filling

The total dry ingredients were blended one minute at low speed using a Hobart C–100 mixer equipped with a 3 quart bowl and wire whip. Water was added over a two minute period while blending at low speed. The bowl was scraped after 1½ minutes and mixing was continued for one additional minute in second speed. The whip topping base was added and mixed in at low speed for 1 minute, then whipped in second speed for 1 minute. The bowl was scraped and mixing at second speed continued for 5 additional minutes.

In this test the following esters of the dicarboxylic acids were completely converted to their sodium salts in accordance with their acid numbers. This was accomplished by incorporating 0.1 N sodium hydroxide during

TABLE 1.—EXPERIMENTAL RESULTS OF CAKE BAKING TESTS

| Compound | SSA | | SMA | | SFA | | SGA | |
|---|---|---|---|---|---|---|---|---|
| Level, percent | 0 | 0.8 | 0 | 1 | 0 | 1.5 | 0 | 0.8 |
| Form | | Acid | Salt | | | Salt | | Acid |
| Cake type | White layer (D) | | Yellow whip | | Yellow whip | | White layer (D) | |
| Shortening level, percent | 10 | 10 | | | | | 10 | 10 |
| Batter temp., °F | 74 | 72 | 71 | 71 | 70 | 74 | 74 | 72 |
| Sp. gravity | 1.12 | 1.00 | 0.87 | 0.88 | 0.89 | 0.73 | 1.12 | 1.06 |
| Volume, cc | 800 | 945 | 1,110 | 1,045 | 1,127 | 1,150 | 800 | 910 |
| Total score | 71.5 | 80.0 | 80.5 | 83.5 | 80.5 | 90.0 | 71.5 | 76.0 |

TABLE 2

| Compound | SFA | | OFA | | SCA | |
|---|---|---|---|---|---|---|
| Level, percent | 0 | 2 | 2 | 0 | 2 | 0 | 2 |
| Form | | ½ salt [1] | Salt | | ½ salt [1] | | Salt [1] |
| Cake type | White whip | | White whip | | White whip | |
| Shortening level | | | | | | |
| Batter temp., °F | 71 | 72 | 74 | 71 | 70 | 71 | 70 |
| Sp. gravity | 1.03 | 0.88 | 0.77 | 1.03 | 0.92 | 1.03 | 0.93 |
| Volume, cc | 925 | 1,035 | 1,155 | 925 | 1,020 | 925 | 1,060 |
| Total score | 74.0 | 88.0 | 90.0 | 74.0 | 81.5 | 74.0 | 79.0 |

[1] Hydrate.

NOTE.—Interpretation of data in tables 1 and 2:
Level: Baker's percent of compound used in cake.
Form: Acid indicates that the compound was used un-neutralized; Salt indicates that the compound was fully neutralized in accordance with its acid number; ½ salt indicates that the compound was neutralized in accordance with one-half its acid number; Hydrate indicates that the compound was mixed with water above its melting point and cooled with mixing until a hydrate was obtained.
Batter temp.: Temperature of a test batter should be within 4° F. of the control batter for the results to be significant.
Specific gravity: Weight of a batter per unit volume measured immediately before pouring the batter into the pan. It is measured in gm./cc. A difference of 0.04 or more is significant.
Volume: Volume of the cake one hour after it has been removed from the oven. It is measured by rape seed displacement. A difference of 50 cc. is considered significant.
Total score: Score is obtained in accordance with the scoring system described supra. A difference of 3 or more points is considered significant.

Additional tests were run to determine the effectiveness of the agents reported herein in improving the properties of a dessert cream filling. These tests are described below.

The tests results obtained and recorded in Tables 1 and 2 conclusively demonstrate that the chemically leavened baked goods containing the improving agents described herein have unexpectedly enhanced properties.

Formula: Dessert cream filling

Ingredients: Grams
Powdered sugar _____ 200
Cocoa _____ 75
Instant tapioca starch _____ 50
Milk solids _____ 50
Salt _____ 2
Vanilla _____ 4
Ice water _____ 500
A prepared whip topping base _____ 230

The whip topping base used was a commercial formulation commonly used in this type of product. It included the following ingredients which are listed in order of their predominance.

(1) Water
(2) Vegetable fat
(3) Sucrose
(4) Cellulose gums
(5) Polyoxyethylene (20) sorbitan monostearate
(6) Sodium sulfo-acetate of mono- and diglycerides
(7) Salt
(8) Artificial flavor
(9) Beta carotene the preparation of hydrates which contained 9 parts of water to each part of compound.

| Code | Additive | Acid number |
|---|---|---|
| SADA | Monostearyl adipic acid | 115 |
| SSA | Monostearyl succinic acid | 157.1 |
| SAZA | Monostearyl azelaic acid | 115 |
| OFA | Monooleyl fumaric acid | 149 |

Hydrates were incorporated at the first stage of the cream filling make-up as a partial substitute for water. The level of usage was held constant at 0.5% of the compound based on the total formulation weight.

The data listed below in Table 3 was recorded during make-up.

TABLE 3

| Compound | Control | SSA | SAZA | SADA | OFA |
|---|---|---|---|---|---|
| Level, percent | | 0.5 | 0.5 | 0.5 | 0.5 |
| Form | | Salt | Salt | Salt | Salt |
| Filling type | | Chocolate cream | | | |
| Mix temp., °F | 56 | 61 | 60 | 60 | 58 |
| Sp. gravity | 0.89 | 0.80 | 0.82 | 0.83 | 0.76 |

These data show that the addition of the fatty alcohol derivatives of dicarboxylic acids produces a marked improvement in the final specific gravity of the product. Subsequent tests demonstrated that the freeze-thaw stability of the treated fillings was much improved. Further, the use of the additives of this invention produced a dessert exhibiting improved machinability, appearance, texture and mouth feel.

The superior performance of lower molecular weight dicarboxylic acid half esters is clear in this demonstration. Of the compounds tested, monooleyl fumaric acid (OFA) showed greatest functionality as an aid to incorporation and retention of air in the system concurrent with improved freeze-thaw stability.

The invention in its broader aspects is not limited to the specific compositions, steps and methods described, but departures may be made therefrom within the scope of the accompanying claims without departing from the principles of the invention and without sacrificing its chief advantages.

What is claimed:

1. A chemically leavened cake product containing flour having incorporated therein an addition agent consisting essentially of an effective amount in an amount of at least 0.05 percent by weight based on weight of flour of a non-toxic, mono aliphatic ester of a dicarboxylic acid corresponding to the formula:

$$R^1OOCRCOOZ$$

wherein $R^1$ is a member selected from the group consisting of an aliphatic substituent containing 12 to 24 carbon atoms and mixtures thereof; R is an aliphatic group containing up to and including 8 carbon atoms and Z is a member selected from the group consisting of hydrogen, alkali metal, alkaline earth metal, ammonium and aluminum.

2. The product of claim 1 wherein said mono aliphatic ester is a member selected from the group consisting of succinic, glutaric, adipic, fumaric, malic, azelaic and sebacic esters and mixtures thereof.

3. A chemically leavened cake product containing flour having incorporated therein an addition agent consisting essentially of an effective amount in an amount of at least 0.05 percent by weight based on weight of flour of a mono aliphatic ester of a dicarboxylic acid which is a member selected from the group consisting of mono aliphatic ester of succinic glutaric and adipic and mixtures thereof wherein said aliphatic group is a member selected from the group consisting of an aliphatic substituent containing 12 to 24 carbon atoms and mixtures thereof; and wherein said mono aliphatic ester is a member selected from the group consisting of the mono aliphatic acid ester, the sodium, potassium, calcium and magnesium salt and hydrates thereof.

4. A chemically leavened cake product containing flour having incorporated therein an addition agent consisting essentially of an effective amount in the amount of about 0.05 to 2.0 percent by weight based on weight of flour of a non-toxic, mono aliphatic ester of a dicarboxylic acid corresponding to the formula:

$$R^1OOCRCOOZ$$

wherein $R^1$ is a member selected from the group consisting of an aliphatic substituent containing 12 to 24 carbon atoms and mixtures thereof; R is an aliphatic group containing up to and including 8 carbon atoms and Z is a member selected from the group consisting of hydrogen, alkali metal, alkaline earth metal, ammonium and aluminum.

5. The product of claim 4 wherein said mono aliphatic ester is a member selected from the group consisting of succinic, glutaric, adipic, fumaric, malic, azelaic and sebacic esters and mixtures thereof.

6. The product of claim 5 wherein said mono aliphatic ester is the hydrate of said ester.

7. The product of claim 5 wherein said aliphatic substituent contains 16 to 18 carbon atoms and mixtures thereof.

8. The product of claim 4 wherein said mono aliphatic ester is a member selected from the group consisting of the sodium and calcium salts of cetyl and stearyl esters and mixtures thereof.

9. A chemically leavened cake product containing flour having incorporated therein an addition agent consisting essentially of an effective amount in the amount of about 0.05 to 2.0 percent by weight based on weight of flour of a mono aliphatic ester of succinic acid corresponding to the formula:

$$R^1OOC(CH_2)_2COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

10. A chemically leavened cake product containing flour having incorporated therein an addition agent consisting essentially of an effective amount in the amount of about 0.05 to 2.0 percent by weight based on weight of flour of a mono aliphatic ester of glutaric acid corresponding to the formula:

$$R^1OOC(CH_2)_3COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

11. A chemically leavened cake product containing flour having incorporated therein an addition agent consisting essentially of an effective amount in the amount of about 0.05 to 2.0 percent by weight based on weight of flour of a mono aliphatic ester of adipic acid corresponding to the formula:

$$R^1OOC(CH_2)_4COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

12. A chemically leavened cake product containing flour having incorporated therein addition agent consisting essentially of an effective amount in the amount of about 0.05 to 2.0 percent by weight based on weight of flour of a mono aliphatic ester of fumaric acid corresponding to the formula:

$$R^1OOCCH=CHCOOZ \text{ (trans)}$$

wherein $R^1$ is a member selected from the group consisting of an aliphatic substituents containing 12 to 24 carbon atoms and mixtures thereof; and Z is a member selected from the group consisting of hydrogen, sodium, potassium, calcium and magnesium.

13. A chemically leavened cake product containing flour having incorporated therein an addition agent consisting essentailly of an effective amount in the amount of about 0.05 to 2.0 percent by weight based on weight of flour of a mono aliphatic ester of malic acid corresponding to the formula $$R^1OOCCHOHCH_2COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

14. A chemically leavened cake product containing flour having incorporated therein an addition agent consisting essentially of an effective amount in the amount of about 0.05 to 2.0 percent by weight based on weight of flour of a mono aliphatic ester of azelaic acid corresponding to the formula:

$$R^1OOC(CH_2)_7COOZ$$

wherein $R^1$ is a memeber selected from the group consisting of an aliphatic substituent containing 12 to 24 carbon atoms and mixtures thereof; and Z is a member selected from the group consisting of hydrogen, sodium, potassium, calcium and magnesium.

15. A chemically leavened cake product containing flour having incorporated therein an addition agent consisting essentially of an effective amount in the amount of about 0.05 to 2.0 percent by weight based on weight of flour of a mono aliphatic ester of sebacic acid corresponding to the formula:

$$R^1OOC(CH_2)_8COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

16. A bakery confectionary product selected from the group consisting of icings, fillings, fondants and cremes having incorporated therein an addition agent in an amount sufficient to improve freeze-thaw stability comprising a non-toxic, mono aliphatic ester of a dicarboxylic acid corresponding to the formula:

$$R^1OOCRCOOZ$$

wherein $R^1$ is a member selected from the group consisting of an aliphatic substituent containing 12 to 24 carbon atoms and mixtures thereof; R is an aliphatic group containing up to and including 8 carbon atoms and Z is a member selected from the group consisting of hydrogen, alkali metal, alkaline earth metal, ammonium and aluminum.

17. The product of claim 16 wherein said mono aliphatic ester is a member selected from the group consisting of succinic, glutaric, adipic, fumaric, malic, azelaic and sebacic esters and mixtures thereof.

18. The product of claim 17 wherein said mono aliphatic ester is the hydrate of said ester.

19. The product of claim 17 wherein said aliphatic substituent contains 16 to 18 carbon atoms and mixtures thereof.

20. The product of claim 16 wherein said mono aliphatic ester is a member selected from the group consisting of succinic, glutaric and adipic esters and mixtures thereof.

21. A chemically leavened cake product containing flour having incorporated therein an addition agent consisting essentially of an effective amount in an amount of about 0.05 to 2.0 percent weight based on weight of flour of sodium cetyl succinate.

22. A chemically leavened cake product containing flour having incorporated therein an addition agent consisting essentially of an effective amount in an amount of about 0.05 to 2.0 percent weight based on weight of flour of sodium stearyl succinate.

23. A chemically leavened cake product containing flour having incorporated therein an addition agent consisting essentially of an effective amount in an amount of about 0.05 to 2.0 percent weight based on weight of flour of sodium cetyl fumarate.

24. A chemically leavened cake product containing flour having incorporated therein an addition agent consisting essentially of an effective amount in an amount of about 0.05 to 2.0 percent weight based on weight of flour of sodium stearyl fumarate.

25. A bakery confectionary product selected from the group consisting of icings, fillings, fondants and cremes having incorporated therein an addition agent in an amount sufficient to improve freeze-thaw stability comprising sodium cetyl succinate.

26. A bakery confectionary product selected from the group consisting of icings, fillings, fondants and cremes having incorporated therein an addition agent in an amount sufficient to improve freeze-thaw stability comprising sodium stearyl succinate.

27. A bakery confectionary product selected from the group consisting of icings, fillings, fondants and cremes having incorporated therein an addition agent in an amount sufficient to improve freeze-thaw stability comprising sodium cetyl fumarate.

28. A bakery confectionary product selected from the group consisting of icings, fillings, fondants and cremes having incorporated therein an addition agent in an amount sufficient to improve freeze-thaw stability comprising sodium stearyl fumarate.

29. A bakery confectionary product selected from the group consisting of icings, fillings fondants and cremes having incorporated therein an addition agent comprising an effective amount in an amount of about 0.5 percent based on the total formulation weight of a stabilizing mono aliphatic ester of succinic acid corresponding to the formula:

$$R^1OOC(CH_2)_2COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

30. A bakery confectionary product selected from the group consisting of icings, fillings, fondants and cremes having incorporated therein an addition agent comprising an effective amount in an amount of about 0.5 percent based on the total formulation weight of a stabilizing mono aliphatic ester of glutaric acid corresponding to the formula:

$$R^1OOC(CH_2)_3COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

31. A bakery confectionary product selected from the group consisting of icings, fillings, fondant and cremes having incorporated therein an addition agent comprising an effective amount in an amount of about 0.5 percent based on the total formulation weight of a stabilizing mono aliphatic ester of adipic acid corresponding to the formula:

$$R^1OOC(CH_2)_4COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

32. A bakery confectionary product selected from the group consisting of icings, fillings, fondant and cremes having incorporated therein an addition agent comprising an effective amount in an amount of about 0.5 percent based on the total formulation weight of a stabilizing mono aliphatic ester of fumaric acid corresponding to the formula:

$$R^1OOCCH=CHCOOZ \text{ (trans)}$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

33. A bakery confectionary product selected from the group consisting of icings, fillings, fondants and cremes having incorporated therein an addition agent comprising an effective amount in an amount of about 0.5 percent based on the total formulation weight of a stabilizing mono aliphatic ester of malic acid corresponding to the formula:

$$R^1OOCCHOH_2COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

34. A bakery confectionary product selected from the group consisting of icings, fillings, fondants and cremes having incorporated therein an addition agent comprising an effective amount in an amount of about 0.5 percent based on the total formulation weight of a stabilizing mono aliphatic ester of azelaic acid corresponding to the formula:

$$R^1OOC(CH_2)_7COOZ$$

wherein $R^1$ is a member selected from the group consisting of an aliphatic subtsituent containing 12 to 24 carbon atoms and mixtures thereof; and Z is a member selected from the group consisting of hydrogen, sodium, potassium, calcium and magnesium.

35. A bakery confectionary product selected from the group consisting of icings, fillings, fondants and cremes having incorporated therein an addition agent comprising an effective amount in an amount of about 0.5 percent based on the total formulation weight of a stabilizing mono aliphatic ester of sebacic acid corresponding to the formula:

$$R^1OOC(CH_2)_8COOZ$$

wherein $R^1$ is a member selected from the group consisting of an aliphatic substituent containing 12 to 24 carbon atoms and mixtures thereof; and Z is a member selected from the group consisting of hydrogen, sodium, potassium, calcium and magnesium.

References Cited
UNITED STATES PATENTS

| | | | |
|---|---|---|---|
| 3,216,829 | 11/1965 | Hansen | 99—118 |
| 3,145,109 | 8/1964 | Howard | 99—118 |
| 3,246,992 | 4/1966 | Noznick et al. | 99—139 |

FOREIGN PATENTS

| | | | |
|---|---|---|---|
| 652,006 | 4/1951 | Great Britain | 99—91 |

RAYMOND N. JONES, Primary Examiner

U.S. Cl. X.R.

99—139, 123, 134